United States Patent
Wu et al.

(10) Patent No.: US 11,803,360 B2
(45) Date of Patent: Oct. 31, 2023

(54) COMPILATION METHOD, APPARATUS, COMPUTING DEVICE AND MEDIUM

(71) Applicant: TSINGHUA UNIVERSITY, Beijing (CN)

(72) Inventors: Huaqiang Wu, Beijing (CN); Ruihua Yu, Beijing (CN); Yilong Guo, Beijing (CN); Jianshi Tang, Beijing (CN); Bin Gao, Beijing (CN); He Qian, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 221 days.

(21) Appl. No.: 17/517,096

(22) Filed: Nov. 2, 2021

(65) Prior Publication Data
US 2022/0137941 A1    May 5, 2022

(30) Foreign Application Priority Data
Nov. 3, 2020    (CN) .......................... 202011209731.9

(51) Int. Cl.
G06F 8/41    (2018.01)
G06F 17/16    (2006.01)
G06N 3/10    (2006.01)

(52) U.S. Cl.
CPC .............. *G06F 8/443* (2013.01); *G06F 17/16* (2013.01); *G06N 3/10* (2013.01)

(58) Field of Classification Search
CPC ........... G06F 8/443; G06N 17/16; G06N 3/10
(Continued)

(56) References Cited

U.S. PATENT DOCUMENTS

2007/0266366 A1* 11/2007 Bucuvalas .......... G06F 11/3612
                                                              717/104
2015/0331850 A1* 11/2015 Ramish ................... G06F 40/40
                                                              704/9
(Continued)

FOREIGN PATENT DOCUMENTS

CN    110717584 A    1/2020
CN    110766147 A    2/2020
(Continued)

OTHER PUBLICATIONS

Title: Lifting assembly to intermediate representation: A novel approach leveraging compilers, author: N Hasabnis, et al, published on 2016.*
Title: Learning fair representations, author: R Zemel, et al, published on 2013.*
(Continued)

*Primary Examiner* — Chameli Das
(74) *Attorney, Agent, or Firm* — Scully, Scott, Murphy & Presser, P.C.

(57) ABSTRACT

A compilation method, a compilation apparatus suitable for an In-Memory Computing apparatus, a computing device and a storage medium. The compilation method includes: acquiring calculation information of an algorithm to be compiled; converting the algorithm to be compiled into the first intermediate representation according to the calculation information; mapping the first intermediate representation to the second intermediate representation; and compiling the algorithm to be compiled into instruction information recognized by the In-Memory Computing apparatus according to the hardware information, to make the In-Memory Computing apparatus execute the instruction information. The compilation method may compile the calculation information into instructions that may be directly executed by the In-Memory Computing apparatus, so as to realize the effect (Continued)

of accelerating the operations of various algorithms by using the In-Memory Computing apparatus.

18 Claims, 10 Drawing Sheets

(58) Field of Classification Search
USPC .......................................................... 717/146
See application file for complete search history.

(56) References Cited

U.S. PATENT DOCUMENTS

| | | | | |
|---|---|---|---|---|
| 2016/0110175 | A1* | 4/2016 | Fink | G06F 8/443 717/137 |
| 2020/0034453 | A1* | 1/2020 | Sato | H04L 63/123 |
| 2021/0365253 | A1* | 11/2021 | Zhai | G06F 8/47 |

FOREIGN PATENT DOCUMENTS

| | | |
|---|---|---|
| CN | 112465108 A | 3/2021 |
| CN | 112529175 A | 3/2021 |
| CN | 112598121 A | 4/2021 |

OTHER PUBLICATIONS

Chen, T. et al., "TVM: An Automated End-to-End Optimizing Compiler for Deep Learning", OSDI '18: Proceedings of the 13th USENIX conference on Operating Systems Design and Implementation, Oct. 2018, pp. 1-16.

Bojnordi, M. et al., "Memristive Boltzmann Machine: A Hardware Accelerator for Combinatorial Optimization and Deep Learning", 2016 IEEE International Symposium on High Performance Computer Architecture (HPCA), 2016, pp. 1-13.

Ambrosi, J. et al., "Hardware-Software Co-Design for an Analog-Digital Accelerator for Machine Learning", 2018 EEE International Conference on Rebooting Computing (ICRC), 2018, pp. 1-13.

* cited by examiner

US 11,803,360 B2

COMPILATION METHOD, APPARATUS, COMPUTING DEVICE AND MEDIUM

CROSS-REFERENCE TO RELATED APPLICATION

This application claims priority to Chinese Patent Application No. CN 202011209731.9 filed on Nov. 3, 2020, the entire disclosure of which is incorporated herein by reference as part of the disclosure of this application.

TECHNICAL FIELD

Embodiments of the present disclosure relate to a compilation method suitable for an In-Memory Computing apparatus, a compilation apparatus suitable for an In-Memory Computing device, a computing device and a medium.

BACKGROUND

An In-Memory Computing system may efficiently realize part of calculation operation by using a memory array. The In-Memory Computing system has characteristics of strong parallel processing ability, low energy consumption and high computational power, and the computing system has become one of the most effective ways to accelerate AI algorithms at present.

A traditional compiler architecture is difficult to compile an algorithm model into the In-Memory Computing system, which makes it impossible to use the In-Memory Computing system to accelerate the operations of the algorithm model.

SUMMARY

At least one embodiment of the present disclosure provides a compilation method suitable for an In-Memory Computing apparatus, comprising: acquiring calculation information of an algorithm to be compiled; converting the algorithm to be compiled into the first intermediate representation according to the calculation information, the first intermediate representation comprises an operator operation executed by the In-Memory Computing apparatus; mapping the first intermediate representation to the second intermediate representation, the second intermediate representation comprises a corresponding relationship between hardware information of the In-Memory Computing apparatus and the operator operation; and compiling the algorithm to be compiled into instruction information recognized by the In-Memory Computing apparatus according to the corresponding relationship, to make the In-Memory Computing apparatus execute the instruction information.

For example, in the method provided by one embodiment of the present disclosure, the In-Memory Computing apparatus comprises a cross array composed of non-volatile memory devices for In-Memory Computing system, and the operator operation comprises a matrix-vector multiplication operation.

For example, in the method provided by one embodiment of the present disclosure, converting the operation to be compiled into the first intermediate representation according to the calculation information comprises: performing a parsing operation on the algorithm to be compiled, and generating a third intermediate representation according to a parsing result of the parsing operation, the third intermediate representation comprises a computational graph representation form of the algorithm to be compiled; decomposing the algorithm to be compiled into the operator operation comprised in the In-Memory Computing apparatus according to the computational graph representation form; and converting the third intermediate representation into the first intermediate representation comprising the operator operation according to the operator operation.

For example, in the method provided by one embodiment of the present disclosure, the algorithm to be compiled comprises a neural network algorithm.

For example, in the method provided by one embodiment of the present disclosure, the neural network algorithm is developed based on any one of a plurality of different deep learning frameworks and is transformed into the computational graph representation form.

For example, in the method provided by one embodiment of the present disclosure, the computational graph representation form comprises an open neural network exchange format (e.g., ONNX).

For example, in the method provided by one embodiment of the present disclosure, the method further comprises: acquiring definition information of the operator operation executed by the In-Memory Computing apparatus, wherein the definition information is used to describe the operator operation, wherein decomposing the algorithm to be compiled into the operator operation comprised in the In-Memory Computing apparatus according to the computational graph representation form comprises: determining the operator operation corresponding to a calculation operation comprised in the computational graph representation form according to the definition information.

For example, in the method provided by one embodiment of the present disclosure, the calculation operation comprises a convolution operation, and the operator operation comprises a matrix-vector multiplication operation, wherein determining the operator operation corresponding to the calculation operation comprised in the computational graph representation form according to the definition information comprises: determining at least one convolution kernel of the convolution operation and data to be convolved according to the calculation information; according to the definition information of the matrix-vector multiplication operation, determining that the operator operation associated with the convolution operation comprises a reshaping operation, wherein the reshaping operation is configured to reshape the at least one convolution kernel into a matrix, and the data to be convolved is reshaped into a plurality of vectors, each column in the matrix represents a convolution kernel.

For example, in the method provided by one embodiment of the present disclosure, the In-Memory Computing apparatus comprises a memory array, wherein mapping the first intermediate representation to the second intermediate representation comprises: mapping elements of the matrix in the first intermediate representation to conductance values of memories in the memory array; and mapping the plurality of vectors into which the data to be convolved is reshaped into a voltage vector, respectively, and the voltage vector is used as an input of each row in the memory array, to make the memory array perform a matrix-vector multiplication operation according to the voltage vector and a conductance value matrix formed by the conductance values.

For example, in the method provided by one embodiment of the present disclosure, the operator operation further comprises an activation function.

At least one embodiment of the present disclosure further provides a compilation apparatus suitable for an In-Memory Computing apparatus, comprising: an acquisition unit which is configured to acquire calculation information of an algorithm to be compiled; a conversion unit which is configured to convert the algorithm to be compiled into the first intermediate representation according to the calculation information, wherein the first intermediate representation comprises an operator operation executed by the In-Memory Computing apparatus; a mapping unit which is configured to map the first intermediate representation to the second intermediate representation, the second intermediate representation comprises a corresponding relationship between hardware information of the In-Memory Computing apparatus and the operator operation; and a compilation unit which is configured to compile the algorithm to be compiled into instruction information recognized by the In-Memory Computing apparatus according to the corresponding relationship, so that the In-Memory Computing apparatus performs the calculation operation according to the instruction information.

For example, in the compilation apparatus provided by one embodiment of the present disclosure, the conversion unit comprises: a computational graph generation unit which is configured to parse the algorithm to be compiled, and generate the third intermediate representation according to a parsing result, wherein the third intermediate representation comprises a computational graph representation form comprising the algorithm to be compiled n; a computational graph conversion unit which is configured to decompose the algorithm to be compiled into operator operation comprised in the In-Memory Computing apparatus according to the computational graph representation form, and convert the third intermediate representation to the first intermediate representation comprising the operator operation according to the operator operation.

For example, in the compilation apparatus provided by one embodiment of the present disclosure, the computational graph conversion unit comprises: an operator extension definition unit which is configured to define the operator operation executed by the In-Memory Computing apparatus to determine the definition information of the operator operation; an operator transformation unit which is configured to determine operator operation corresponding to a complex operation comprised in the computational graph representation form according to the definition information; a computational graph optimization unit which is configured to convert the third intermediate representation to the first intermediate representation comprising the operator operation according to the operator operation.

At least one embodiment of the present disclosure further provides a compilation apparatus suitable for an In-Memory Computing apparatus, comprising: a processor; a memory comprising one or more computer program modules; the one or more computer program modules are stored in the memory and are configured to be executed by the processor, and the one or more computer program modules comprise instructions used to realize the compilation method provided by any one of embodiments of the present disclosure.

At least one embodiment of the present disclosure further provides a computing device, comprising: the compilation apparatus provided by any one of embodiments of the present disclosure; and the In-Memory Computing apparatus, the In-Memory Computing apparatus is configured to perform the calculation operation according to the instruction information compiled by the compilation apparatus.

For example, in the computing device provided by one embodiment of the present disclosure, the In-Memory Computing apparatus comprises a cross array, the cross array comprises non-volatile memory devices for the In-Memory Computing apparatus, the operator operation comprises a matrix-vector multiplication operation.

For example, in the computing device provided by one embodiment of the present disclosure, the In-Memory Computing apparatus further comprises: a buffer which is configured to store intermediate data comprised in the second intermediate representation; and a converter which is configured to convert the intermediate data into input data of the cross array.

For example, in the computing device provided by one embodiment of the present disclosure, the In-Memory Computing apparatus further comprises: a functional unit which is configured to distribute the input data to a plurality of cross arrays.

At least one embodiment of the present disclosure further provides a storage medium which non-temporarily stores computer-readable instructions, and when the computer-readable instructions are executed by a computer, the compilation method provided by any one of embodiments of the present disclosure may be executed.

BRIEF DESCRIPTION OF THE DRAWINGS

In order to illustrate the technical solutions of the embodiments of the present disclosure more clearly, the following will briefly introduce the attached drawings of the embodiments. Obviously, the attached drawings in the following description merely relate to some embodiments of the present disclosure and are not a limitation of the present disclosure.

DETAILED DESCRIPTION

Figure 1:
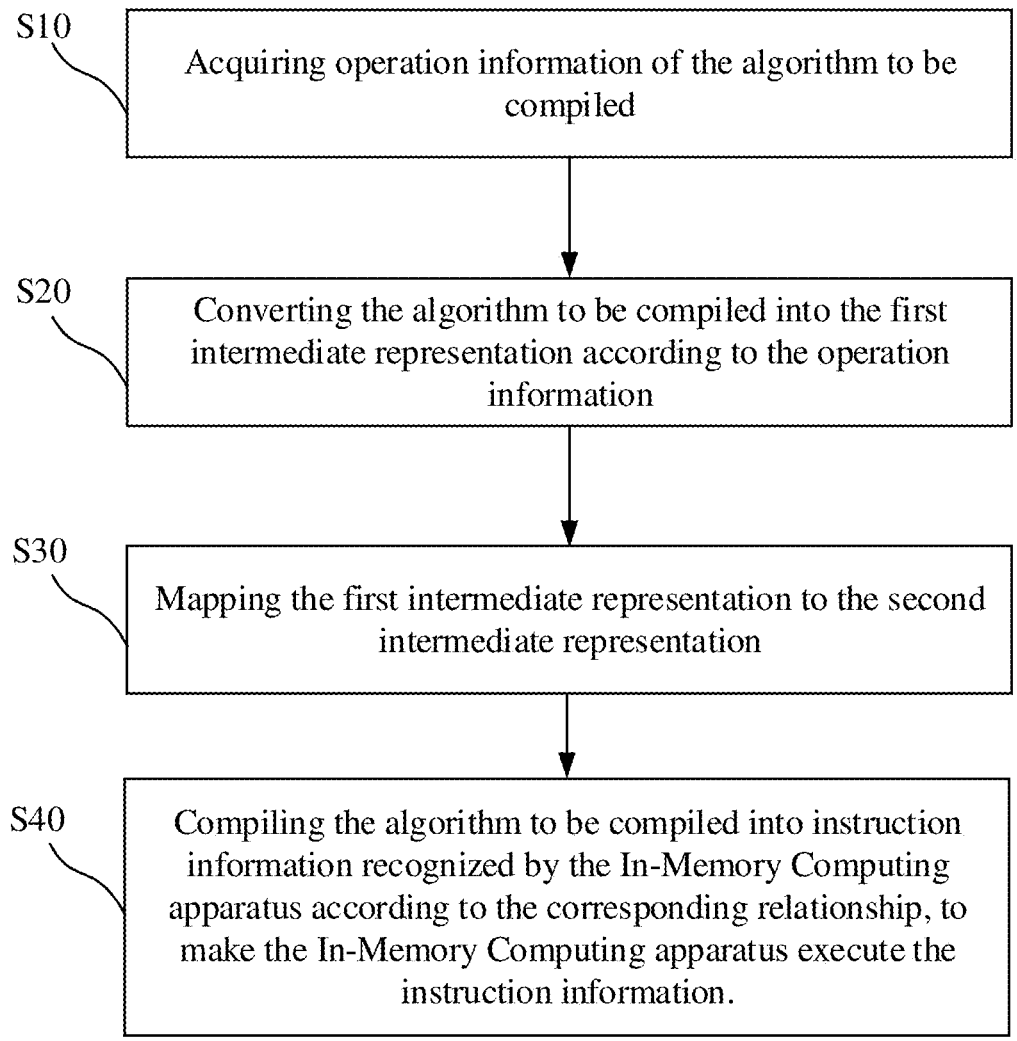
FIG. 1 shows a flow diagram of a compilation method suitable for the In-Memory Computing apparatus provided by at least one embodiment of the present disclosure.

In order to make the purpose, technical solutions and advantages of the embodiments of the present disclosure clearer, the technical solutions in the embodiments of the present disclosure will be described clearly and completely in combination with the attached drawings in the embodiments of the present disclosure. Obviously, the described embodiments are only part of the embodiments of the present disclosure, not all of them. Based on the described embodiments of the present disclosure, all other embodiments obtained by the person of ordinary skill in the art without making creative work shall fall within the protection scope of the present disclosure.

Unless otherwise defined, the technical or scientific terms used in the present disclosure shall have the usual meanings understood by those with ordinary skills in the field to which this disclosure belongs. The words "first", "second" and similar words used in the present disclosure do not mean any order, quantity, or importance, but are only used to distinguish different components. Similarly, similar words such as "a", "an" or "the" do not mean a quantitative limit, but the existence of at least one. Similar words such as "including" or "comprising" mean that the elements or items appearing before the word cover the elements or items listed after the word and their equivalents, but do not exclude other elements or items. Similar words such as "connecting" or "connected" are not limited to physical or mechanical connections, but can comprise electrical connections, whether direct or indirect. "Up", "down", "left", "right" and so on are only used to represent the relative position relationship, and when the absolute position of the described object changes, the relative position relationship may also change accordingly.

For example, the In-Memory Computing apparatus may refer to an apparatus composed of components capable of realizing an In-Memory Computing mode, and may contain one or more CIM (Computing-in-memory) chips. This device with the In-Memory Computing mode may comprise, for example, new memories such as resistive memory, Phase Change Memory (PCM), Magnetic Random Access Memory (MRAM), memristor, and traditional memories such as Static Random Access Memory (SRAM) and Flash Memory.

The In-Memory Computing apparatus may implement both information storage and computing by using emerging non-volatile memory devices or traditional memory devices as described above. The In-Memory Computing apparatus has strong data parallel processing ability, low energy consumption and high computational power, and can efficiently perform calculation operation of many algorithm models, so that the In-Memory Computing apparatus has become one of the most effective ways to accelerate operations at present. In related technologies, algorithm models are often written in C++, Python, and other languages. The In-Memory Computing apparatus cannot directly identify and calculate these algorithm models. Therefore, the calculation operation needs to be compiled into instructions that can be executed by the In-Memory Computing apparatus for execution by the In-Memory Computing apparatus. However, in related technologies, there is no compilation method to compile an algorithm model into instructions that can be executed by the In-Memory Computing apparatus, which results in low applicability of accelerating the algorithm by using the In-Memory Computing apparatus.

At least one embodiment of the present disclosure provides a compilation method suitable for the In-Memory Computing apparatus, comprising: acquiring calculation information of the algorithm to be compiled; converting the algorithm to be compiled into the first intermediate representation according to the calculation information, and the first intermediate representation comprises an operator operation executed by the In-Memory Computing apparatus; mapping the first intermediate representation to the second intermediate representation, and the second intermediate representation comprises the corresponding relationship between the hardware information of the In-Memory Computing apparatus and the operator operation; and compiling the algorithm to be compiled into the instruction information recognized by the In-Memory Computing apparatus according to the corresponding relationship, to make the In-Memory Computing apparatus execute the instruction information.

Some embodiments of the present disclosure also provide a compilation apparatus, a computing device and a storage medium corresponding to the above compilation method.

The compilation method provided by the embodiments of the present disclosure may decompose the calculation information into unique operator operation of the In-Memory Computing apparatus, and can generate efficient and accurate instruction information that may be executed by the In-Memory Computing apparatus in combination with the hardware characteristics of the In-Memory Computing apparatus, so that various algorithms can be accelerated by using the In-Memory Computing apparatus. The applicability of the In-Memory Computing apparatus is improved. At the same time, multi-layer intermediate representations with different forms (for example, the first intermediate representation and the second intermediate representation) are used to transform and describe the algorithm model, which may better expand and improve the compilation process.

The compilation method suitable for the In-Memory Computing apparatus provided by the embodiments of the present disclosure is described below in combination with FIG. 1.

FIG. 1 is a flow diagram of a compilation method suitable for the In-Memory Computing apparatus provided by at least one embodiment of the present disclosure.

As shown in FIG. 1, the compilation method may comprise steps S10-S40.

Step S10: acquiring the calculation information of the algorithm to be compiled.

Step S20: converting the algorithm to be compiled into the first intermediate representation according to the calculation information.

Step S30: mapping the first intermediate representation to the second intermediate representation.

Step S40: according to the corresponding relationship, compiling the algorithm to be compiled into the instruction information recognized by the In-Memory Computing apparatus, to make the In-Memory Computing apparatus execute the instruction information. For step S10, the calculation information may be, for example, a script of an algorithm to be compiled developed by a software language (for example, C++, python, etc.). For example, the algorithm to be compiled may be a neural network algorithm developed by using any of a plurality of different deep learning frameworks.

For example, deep learning frameworks such as Caffe, PyTorch and TensorFlow may be used to develop neural network algorithms Neural network algorithms may comprise, but are not limited to, LeNet, AlexNet, VGGNet, ResNet, CNN, and RNN, etc. For different neural network models, different deep learning frameworks may be used for training, so as to obtain trained model parameters, and for example, the model parameters of a neural network may be stored in a preset file in a certain format. It should be understood that the algorithm to be compiled is not limited to the neural network algorithm, but may also be other algorithms Next, the algorithm to be compiled is taken as a neural network algorithm as an example, which is not limited by the embodiments of the present disclosure.

For example, the calculation information of the algorithm to be compiled may be acquired by reading the preset file, or by accessing the file path.

For step S20, for example, the first intermediate representation comprises operator operation executed by the In-Memory Computing apparatus. The first intermediate representation comprises but is not limited to the representation in the extended Open Neural Network Exchange (ONNX) format and is given in the form of a computational graph.

In step S20, the complex operation in the calculation information is transformed into the unique operator operation of the In-Memory Computing system. For example, the complex operation in the calculation information may be decomposed and transformed into a combination of unique operator operations of the In-Memory Computing system. For example, the algorithm to be compiled is convolution operation, and step S20 may, for example, convert the convolution operation into a matrix-vector multiplication operation that may be efficiently executed by the In-Memory Computing apparatus.

For step S30, for example, the second intermediate representation comprises the corresponding relationship between the hardware information of the In-Memory Computing apparatus and the operator operation. For example, each operator operation is mapped to an actual hardware, so as to realize the conversion from the algorithm to the hardware, and obtain the dependency relationship between the operator operation and the hardware. The second intermediate representation is a format file that contains both operator operations and hardware information, and the operator operations and the hardware information are in one-to-one correspondence. The second intermediate representation comprises but is not limited to the format representation using JSON (Python Script Object Notation), and can also be given in the form of visual computational graph at the same time.

For example, the In-Memory Computing apparatus comprises a cross array composed of non-volatile memory devices for the In-Memory Computing apparatus, and operator operation comprises a matrix-vector multiplication operation. In the example of converting convolution operation into the matrix-vector multiplication operation, if the non-volatile memory device for the In-Memory Computing system is a memristor, hardware information may comprise a memristor array performing the matrix-vector multiplication operation, a voltage signal input to the memristor array, and conductivity values of memristors in the memristor array, etc.

For step S40, the instruction information may be, for example, a binary machine code or an instruction written in a hardware description language. The present disclosure does not limit the form of the instruction information.

For example, the computational graph of the third intermediate expression may be comprehensively optimized in combination with hardware characteristics of the In-Memory Computing system, and instruction codes executed on the In-Memory Computing system may be generated at the same time.

For example, the scheduling optimization of instructions may be carried out for the In-Memory Computing hardware platform, and the mapping mode of the algorithm model may be optimized in combination with the hardware platform, so as to determine the relationship between executed instructions and the block execution scheme for the third intermediate representation. The instruction generation module mainly generates corresponding instruction codes according to the dependency relationship of the third intermediate representation.

Figure 2A:
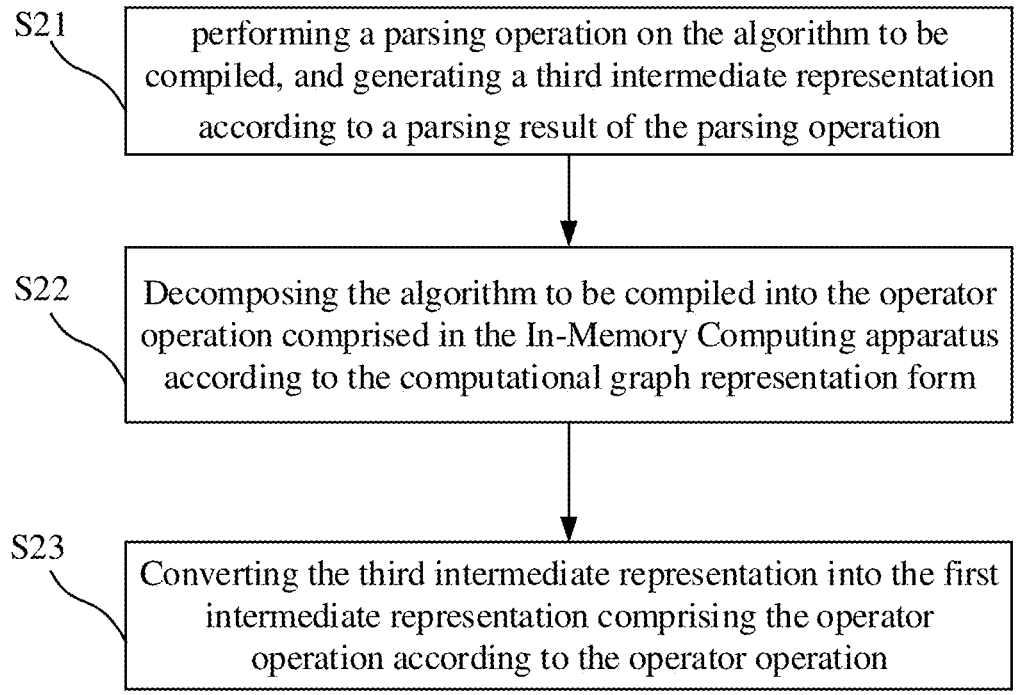
FIG. 2A shows a flow diagram of step S20 in the compilation method shown in FIG. 1 provided by at least one embodiment of the present disclosure.

FIG. 2A shows a flow diagram of step S20 in the compilation method shown in FIG. 1 provided by at least one embodiment of the present disclosure. For example, as shown in FIG. 2A, in some embodiments, step S20 may comprise steps S21-S23.

Step S21: performing a parsing operation on the algorithm to be compiled, and generating a third intermediate representation according to a parsing result of the parsing operation.

For example, the third intermediate representation comprises a computational graph representation form of the algorithm to be compiled.

In some embodiments of the present disclosure, for example, the neural network algorithm may be parsed correspondingly to generate the third intermediate representation based on the deep learning framework suitable for the neural network algorithm.

For example, a Caffe parser is used to parse the calculation information of the algorithm to be compiled acquired through the Caffe deep learning framework, and the TensorFlow parser is used to parse the calculation information of the algorithm to be compiled acquired through the TensorFlow deep learning framework. For example, the compilation device suitable for the In-Memory Computing apparatus provided according to embodiments of the present disclosure may comprise parsers of different deep learning frameworks, to parse the neural network algorithms developed under different deep learning frameworks and generate the third intermediate representation.

The algorithm to be compiled is parsed into the computational graph representation form by using the parsers of various deep learning frameworks, so that in subsequent applications, if the support for a new deep learning framework needs to be added, it is only necessary to add the parser for the model of the new deep learning framework, thereby improving the scalability and compatibility of the compilation method of the embodiments of the present disclosure.

In step S21, the neural network model developed on different deep learning frameworks may be parsed into the third intermediate representation independent of deep learning frameworks, thereby realizing the decoupling of the deep learning framework and the compilation method, and uniformly transforming the neural network algorithms of various deep learning frameworks into the computational graph form in the present invention. For example, the characteristics of python script language may be used to realize the transformation between the parsed result of the neural network algorithm and the third intermediate representation.

In some embodiments of the present disclosure, the computational graph representation form comprises, but is not limited to, an open neural network switching format. For example, TensorFlow and other frameworks may represent neural networks in the form of graphs, while Caffe does not use the form of graphs, but gives the dependency relationship between various calculation operation and network data. It can be seen that different deep learning frameworks and algorithm models need different compilation methods to compile them into instructions that can be executed by the In-Memory Computing system. In order to be compatible with different learning frameworks and algorithm models, the embodiments of the present disclosure propose to convert them into a general third intermediate representation and present them in the form of computational graph. At the same time, it is also convenient for subsequent optimization of the In-Memory Computing system. Since ONNX has different levels of support for mainstream frameworks such as Caffe2, PyTorch, TensorFlow, etc., the third intermediate representation may, but is not limited to, be given in an ONNX format. It should be noted that all deep learning frameworks and algorithm models that can be converted to ONNX format should be comprised in the algorithm supported by this embodiment.

Step S22: decomposing the algorithm to be compiled into the operator operation comprised in the In-Memory Computing apparatus according to the computational graph representation form.

For example, the calculation operation in the computational graph representation form may be decomposed into the operator operations comprised in the In-Memory Computing apparatus one by one.

Figure 2B:
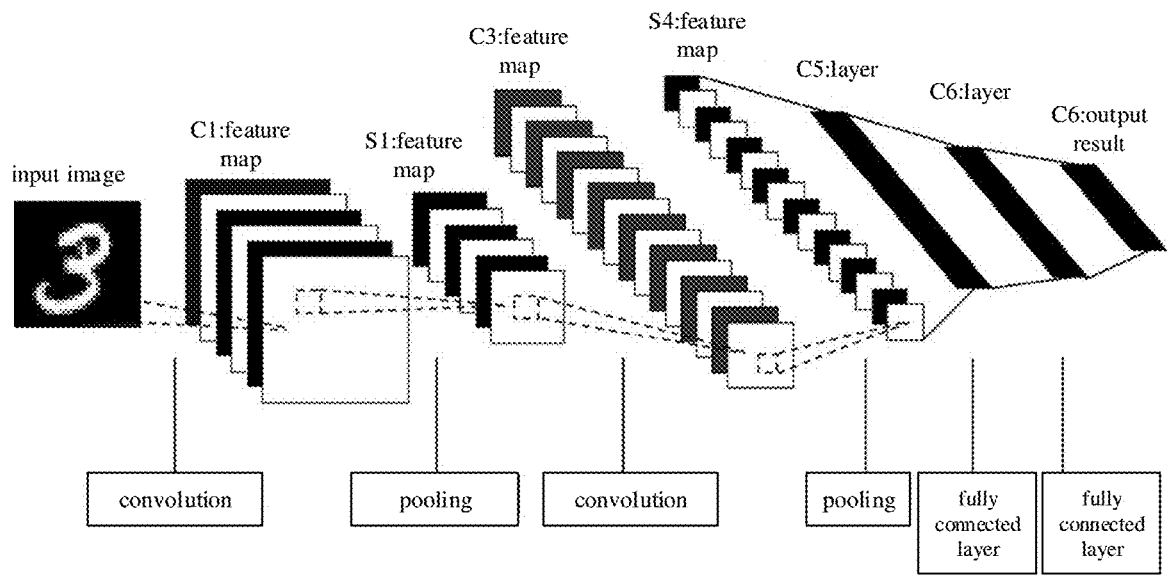
FIG. 2B shows a schematic diagram of a neural network algorithm model.

FIG. 2B shows a schematic diagram of a neural network algorithm model. Taking the neural network algorithm model shown in FIG. 2B as an example to illustrate the implementation of decomposing the algorithm to be compiled into the operator operations comprised in the In-Memory Computing apparatus.

As shown in FIG. 2B, the neural network algorithm may be used to recognize handwritten digits. The neural network algorithm may be, for example, a LeNet-5 network. LeNet-5 is a convolution neural network applied to image classification problems. The goal of the neural network algorithm is to recognize and distinguish 0-9 from a series of grayscale images of handwritten digits.

As shown in FIG. 2B, the convolution neural network may be composed of a series of ordered computing layers, for example, the convolution neural network may comprise a convolution layer, a pooling layer, and a fully connected layer, etc. Different computing layers have different computing tasks. After passing through different computing layers, the image features may be extracted, and the correct outputs may be obtained. Among these computing layers, the most computationally expensive and most important calculation operation is the convolution operation of the convolution layer. For the acceleration of this neural network algorithm, for example, may be the acceleration of the convolution operation. The input image data is convolved with convolution kernels through a convolution layer to obtain an output feature map. After convolution operation, the non-linear function activation layer is usually connected to nonlinearly map the output results. By adding nonlinear factors, the shortcomings of the linear model can be made up. After the pooling operation, the input feature map is compressed to simplify the calculation complexity and extract main features of the image. After a plurality of convolution operation and pooling operation, the image feature may be extracted. Finally, through the fully connected layer, the output information is transmitted to a classifier for classification, thereby completing the task of recognition and classification.

The calculation operation in the computational graph representation form of the third intermediate representation corresponding to the neural network algorithm shown in FIG. 2B may comprise, for example, the convolution operation, the pooling operation, the convolution operation, the pooling operation and the classification operation of the fully connected layer.

For example, the convolution operation, the pooling operation, the convolution operation, the pooling operation and the classification operation of the fully connected layer may be decomposed into the operator operations that may be executed by the In-Memory Computing apparatus one by one. For example, the convolution operation may be decomposed into the operator operation such as reshaping operation and matrix-vector multiplication operation. For example, those skilled in the art may define the operator operations corresponding to the pooling operation and the classification operation of the fully connected layer in the In-Memory Computing apparatus, so as to decompose the pooling operation and the classification operation of the fully connected layer into the operator operations that may be executed by the In-Memory Computing apparatus.

In some embodiments of the present disclosure, some of the operator operations comprised in the In-Memory Computing apparatus may be implemented by hardware resources, and others may be implemented by the software resource. For example, the reshaping operation may be implemented by software resources in a controller, and the matrix-vector multiplication operation may be implemented by the hardware resource.

In some embodiments of the present disclosure, for example, the mapping relationship between the calculation operation and the operator operation may be specified in advance, to determine the operator operation corresponding to the calculation operation according to the mapping relationship. For example, if the convolution operation is specified to be mapped to the matrix-vector multiplication operation in advance, the convolution operation is decomposed into the reshaping operation and matrix-vector multiplication operation in response to the convolution operation comprised in the computational graph representation form.

Step S23: converting the third intermediate representation into the first intermediate representation comprising the operator operation according to the operator operation.

For example, operator operation may be used to replace the calculation operation in the third intermediate representation, thereby generating the first intermediate representation that may be executed in the In-Memory Computing apparatus. For example, the first intermediate representation may also have a computational graph representation form, comprising but not limited to ONNX format.

In some embodiments of the present disclosure, step S20 may further comprise optimizing the third intermediate representation on the basis of steps S21-S23, so that the first intermediate representation may be generated according to the optimized third intermediate representation. This step may be executed, for example, after operation S22 and before step S23. Optimizing the third intermediate representation may comprise, for example, removing the operation in the third intermediate representation that have no impact on the calculation result, and fusing the calculation operations to reduce the number of interactions between the hardware platform and the storage. For example, the operation related to the dimension change involved in the third intermediate representation may be removed, and the operation related to the dimension change may be realized, for example, by the control unit in the In-Memory Computing apparatus without hardware resources.

In some embodiments of the present disclosure, the compilation method described in FIG. 1 may further comprise acquiring the definition information of the operator operation executed by the In-Memory Computing apparatus on the basis of operations S10-S40. For example, the definition information is used to describe the operator operation. In this embodiment, step S22 may comprise: determining the operator operation corresponding to the calculation operation comprised in the computational graph representation form according to the definition information.

The definition information may comprise, for example, input data, output data, function description, etc. of the operator operation. For example, the definition information of the matrix-vector multiplication operation may comprise that the input data is a voltage vector and a matrix, the output data is a current, and the realized function is the multiplication operation of the matrix and the vector.

For example, in response to the calculation operation in the computational graph representation form comprising convolution operation, determining that the operator operation whose function is described as a matrix-vector multiplication operation is the operator operation corresponding to the convolution operation.

In some embodiments of the present disclosure, those skilled in the art may define an operator that may be uniquely implemented by the In-Memory Computing apparatus. For example, the operator operation that may be uniquely implemented by the In-Memory Computing apparatus may be an operation that is not defined in ONNX but can be efficiently executed by the In-Memory Computing apparatus. For example, the matrix-vector multiplication operation is the operation that is not defined in ONNX but can be efficiently executed by the In-Memory Computing apparatus. For example, those skilled in the art may define operator operation such as matrix-vector multiplication operation and activation function.

The compilation method provided by the present disclosure enables those skilled in the art to define the definition information of the operator operation by themselves, so that in subsequent applications, if it is necessary to add the operation executed by the In-Memory Computing system, it is only necessary to define new operator operation, thus further improving the scalability of the compilation method of the embodiments of the present disclosure.

Hereinafter, step S22 is further described by taking the calculation operation as the convolution operation and the operator operation as the matrix-vector multiplication operation as an example.

Figure 3A:
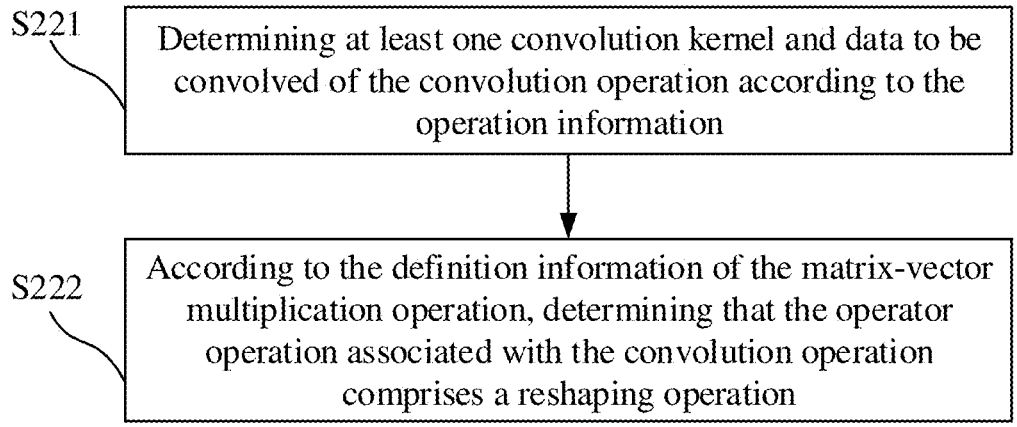
FIG. 3A shows a flow diagram of a method for determining operator operation corresponding to the calculation operation comprised in a computational graph representation form according to definition information provided by one embodiment of the present disclosure.

FIG. 3A shows a flow diagram of a method for determining the operator operation corresponding to the calculation operation comprised in the computational graph representation form according to the definition information provided by embodiments of the present disclosure.

As shown in FIG. 3A, the flow diagram of the method may comprise steps S221-S222.

In step S221, determining at least one convolution kernel of the convolution operation and the data to be convolved according to the calculation information.

For example, in some embodiments of the present disclosure, the data to be convolved may be image data of an image. The tensor of the image data is, for example, $C \times H \times W$. C represents the number of channels. For gray image, $C=1$, for color image, $C=3$. H represents the height of the image, and W represents the width of the image. The convolution kernel may comprise a plurality of convolution kernels to extract a plurality of image features of the image through the plurality of convolution kernels. The tensor of the convolution kernel is, for example, $M \times C/Groups \times KH \times KW$, M represents the number of extracted features (i.e., the number of convolution kernels), Groups represents the number of groups of convolution kernels, C represents the number of channels, KH represents the height of the convolution kernel, KW represents the width of the convolution kernel, and KH and KW are generally equal. For the convolution kernel of each channel, the tensor of the convolution kernel is a tensor of $M \times KH \times KW$.

Step S222: according to the definition information of the matrix-vector multiplication operation, determining that the operator operation associated with the convolution operation comprises a reshaping operation.

For example, the reshaping operation is configured to reshape at least one convolution kernel into a matrix and reshape the data to be convolved into a plurality of vectors. For example, each column in the matrix represents a convolution kernel. The following embodiments illustrate the principle of the reshaping operation. In practical applications, for example, the operator of the predefined reshaping operation may be directly called to make the In-Memory Computing apparatus execute the method described below.

For example, according to the definition information of the matrix-vector multiplication operation, it can be determined that the input data of the matrix-vector multiplication operation are two-dimensional matrix and one-dimensional vector. Because the convolution neural network has the characteristics of weight sharing, the same convolution kernel will participate in the calculation process many times, and the information of the convolution kernel may be directly mapped to the array of the In-Memory Computing system.

Figure 3B:
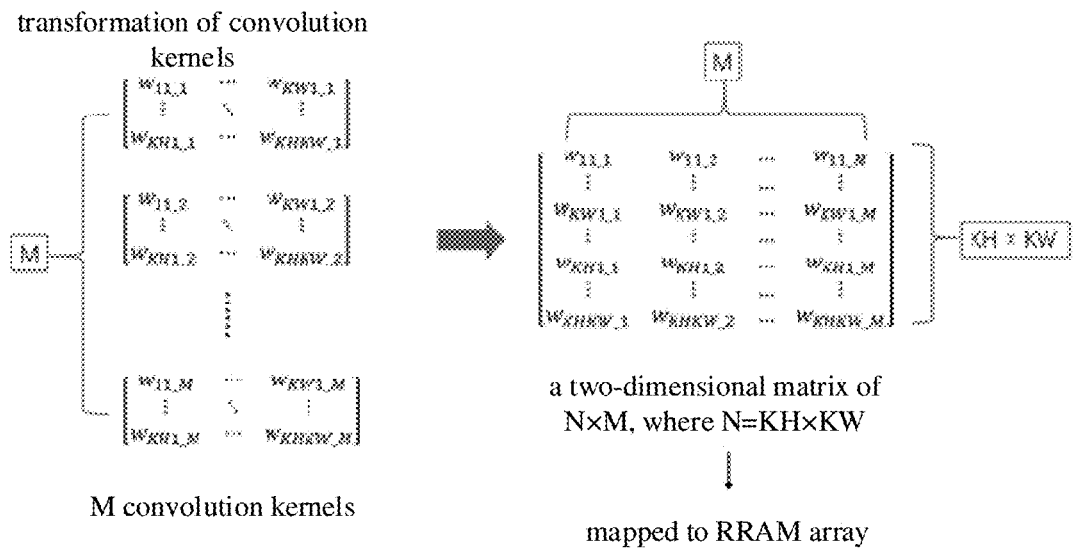
FIG. 3B shows a schematic diagram of reshaping a three-dimensional convolution kernel into a two-dimensional matrix provided by at least one embodiment of the present disclosure.

As described above, the tensor of the convolution kernel is, for example, $M \times C/Groups \times KH \times KW$, where C/Groups is usually taken as 1, then the convolution kernel is a three-dimensional tensor. Therefore, it is necessary to reduce the dimension of the three-dimensional tensor to reshape the convolution kernel into a two-dimensional matrix to obtain the matrix of the convolution kernel. FIG. 3B shows a schematic diagram of reshaping a three-dimensional convolution kernel into a two-dimensional matrix provided by at least one embodiment of the present disclosure.

As shown in FIG. 3B, M convolution kernels form a three-dimensional tensor, each convolution kernel is a two-dimensional matrix, and the size of the two-dimensional matrix is $KH \times KW$. Each two-dimensional matrix of $KH \times KW$ is written as a column vector of $N \times 1$ in a row-by-row sequence, $N=KH \times KW$. Then, a plurality of $N \times 1$ column vectors formed by changing M two-dimensional matrices are arranged column by column into a two-dimensional matrix of $N \times M$, thereby reshaping the three-dimensional convolution kernel into a two-dimensional matrix.

For example, the data to be convolved is image data, and the image data may be reshaped into a plurality of vectors according to the size of the convolution kernel. The tensor of the image data is, for example, C×H×W, C represents the number of channels. For gray images, C=1, and for color image, C=3. For color images, a channel may be selected for convolution operation, and the tensor of image data becomes H×W.

Figure 3C:
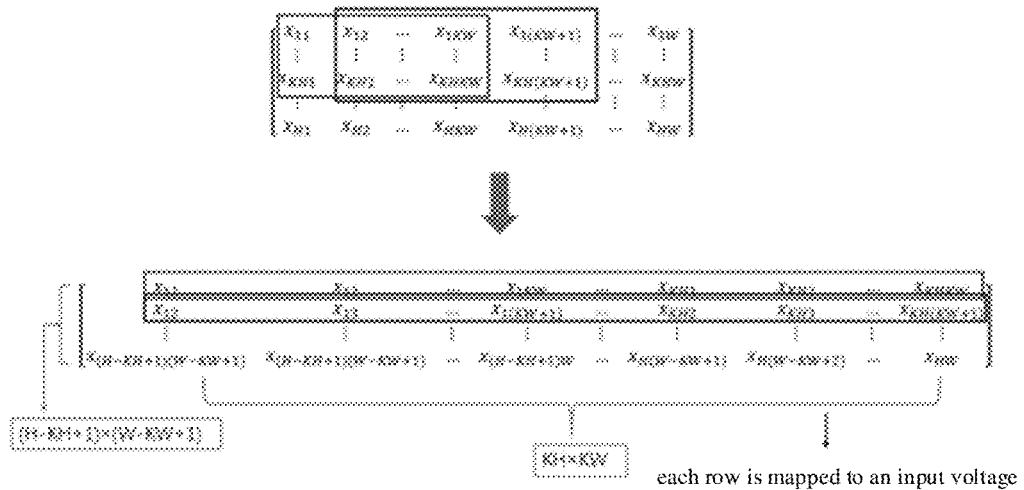
FIG. 3C shows a schematic diagram of reshaping image data into a plurality of vectors provided by at least one embodiment of the present disclosure.

FIG. 3C shows a schematic diagram of reshaping image data into a plurality of vectors provided by at least one embodiment of the present disclosure.

As shown in FIG. 3C, the image data may be matrix A, for example, and the matrix composed of a plurality of vectors reshaped by the matrix A is matrix B, for example.

Because the convolution kernel comprises N rows, the matrix A is reshaped into the matrix B comprising N columns. According to the convolution operation principle, the window with width KW and height KH may be selected to slide from left to right and from top to bottom along the matrix A. The sliding stride S may be equal to 1, for example. S represents the sliding stride of the convolution operation. For example, S=1 means that the step size of convolution kernel sliding on the input image every time is 1 unit length. As shown in FIG. 3C, taking the data in the first window as the first row of the matrix B, the data in the second window as the second row of the matrix B, and so on, until the last window. Thus, (H−KH+1)×(W−KW+1) vectors may be obtained.

It should be noted that before reshaping the image data, it is necessary to consider whether it is necessary to perform a pixel padding operation (Padding) and stride selection on the image data. The pixel padding operation may avoid the problem of image corner data loss and feature map compression, for example, zero filling may be executed around the image data.

It is assumed that the elements in the matrix A of image data are recorded as x(a, b), the elements in the changed matrix B are recorded as x(i,j), and the first element in the matrix A and the matrix B are recorded as x(1,1).

In the absence of Padding, the elements in the matrix A and the matrix B satisfy the following equations.

$$a = 1 + fix\left(i-1, \frac{W-KW}{S}+1\right)*S + fix(j-1, KW) \quad \text{equation (1)}$$

$$b = 1 + \mathrm{mod}\left(i-1, \frac{W-KW}{S}+1\right)*S + \mathrm{mod}(j-1, KW) \quad \text{equation (2)}$$

where fix(x1,x2) represents the quotient of x1 divided by x2, and mod(x1,x2) represents the remainder of x1 divided by x2.

In the case of Padding, the elements in the matrix A and the matrix B satisfy the following equations.

$$a = 1 + fix\left(i-1, \frac{W-KW+2*P}{S}+1\right)*S + fix(j-1, KW) \quad \text{equation (3)}$$

$$|b = \quad \text{equation (4)}$$
$$1 + \mathrm{mod}\left(i-1, \frac{W-KW+2*P}{S}+1\right)*S + \mathrm{mod}(j-1, KW)$$

where fix(x1,x2) represents the quotient of x1 divided by x2, and mod(x1,x2) represents the remainder of x1 divided by x2.

Therefore, each element in the matrix B may be determined by equation (1), equation (2), or equation (3), equation (4), so that each row in the matrix B represents a vector obtained by reshaping the image data.

In the embodiments described in FIG. 3A-FIG. 3C, the In-Memory Computing apparatus comprises a memory array. In operation S30, mapping the first intermediate representation to the second intermediate representation comprises: mapping the elements of the matrix in the first intermediate representation to the conductivity values of the memories in the memory array; and mapping a plurality of vectors reshaped from the data to be convolved into a voltage vector, respectively. The voltage vector is used as the input of each row in the memory array, so that the memory array performs the multiplication operations of the matrix and the vector according to the conductance value matrix composed of the conductivity values and the voltage vector.

Figure 4A:
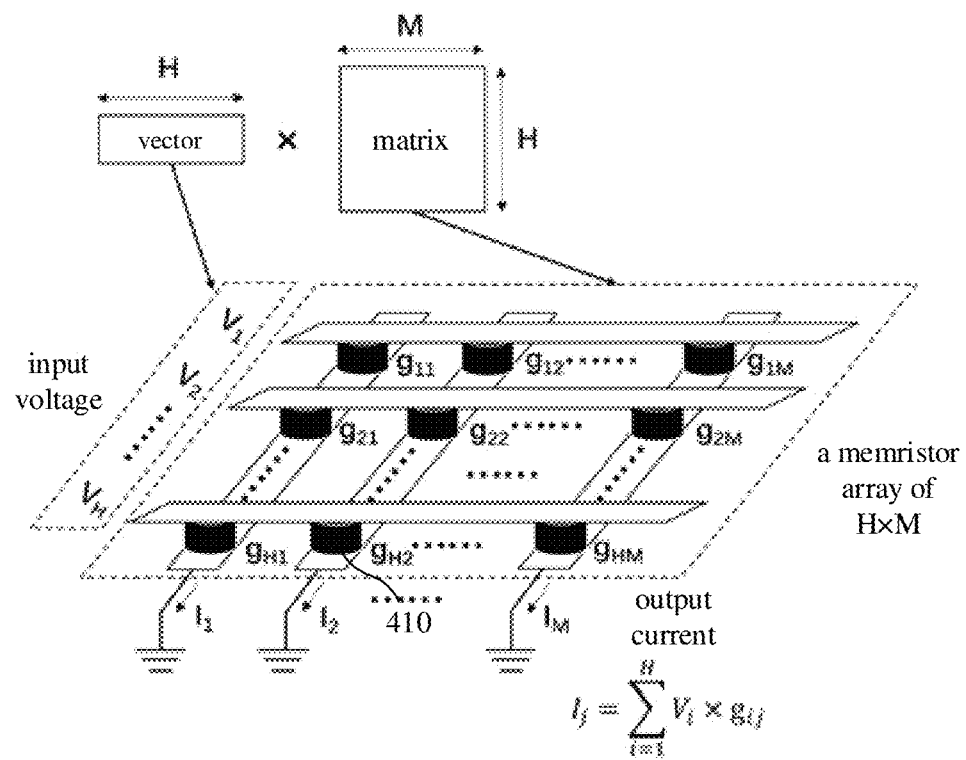
FIG. 4A shows a schematic diagram of an embodiment in which the In-Memory Computing apparatus realizes the matrix-vector multiplication operation provided by at least one embodiment of the present disclosure.

FIG. 4A shows a schematic diagram of an embodiment of an In-Memory Computing apparatus implementing a matrix-vector multiplication operation provided by at least one embodiment of the present disclosure.

As shown in FIG. 4A, the memory array may be, for example, an array composed of a plurality of memristors 410. The electrodes at the same end of each row of memristors 410 are shorted, and the electrodes at the other end of each column of memristors 410 are shorted to form a cross array. Each element in the matrix is mapped to the conductance value $g_{ij}$ of a memristor 410 in the cross array. For example, each element in the two-dimensional matrix of N×M arranged by the convolution kernels described above may be mapped to the conductance value of the memristor 410 in the cross array.

The vector may be mapped to the voltage value $V_i$ applied to one end of each row of memristor 410. Through the Ohm's law and the Kirchhoff's current law, it is easy to conclude that the output current value of column j is $|\Sigma_{i=1}^{H}V_i \times g_{ij}$. $I_j$ is the current value of the image data output under each convolution kernel. Then the obtained current value is output through a transimpedance amplifier or other circuits. Therefore, the vector composed of voltage values and the matrix composed of conductance values may implement the matrix-vector multiplication operation in one step through this memory array. Since the memristor 410 itself has the memory function of the conductivity values, no additional memory devices are required to store the conductivity values in this process. Compared with a traditional computer system, the In-Memory Computing system reduces the occupation of storage resources and the power consumption in the process of memory access, and greatly improves the efficiency of operations.

For a color image, the reshaping operation and the matrix-vector multiplication operation may be executed on each channel according to the above method, respectively, and then the output result under each channel may be obtained (a row vector of 1×M), and then the corresponding elements of the output results of all channels may be added to obtain the result containing all channel information.

Figure 4B:
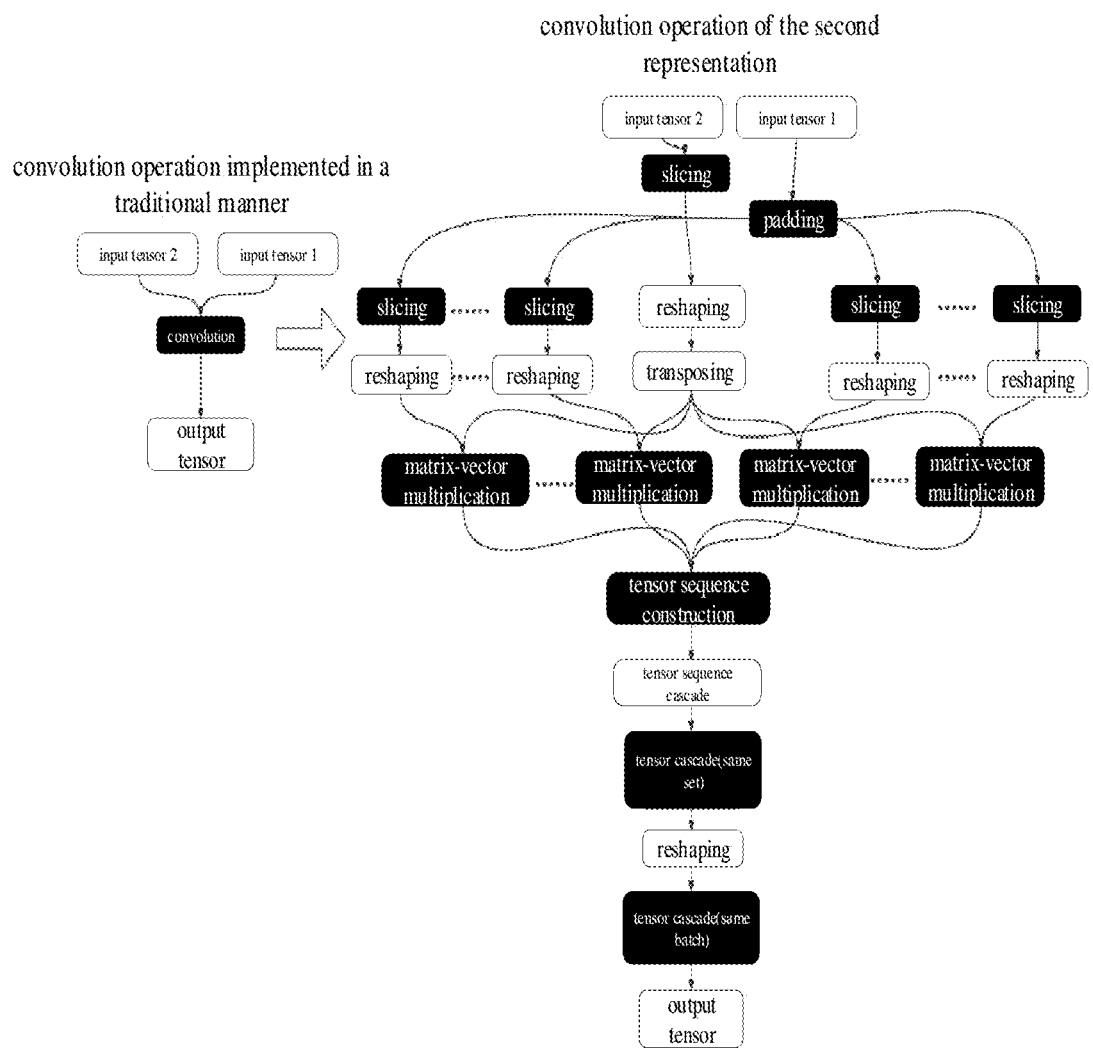
FIG. 4B shows a schematic diagram of the convolution operation implemented in a traditional manner and the convolution operation of the first intermediate representation.

FIG. 4B shows a schematic diagram of the convolution operation implemented in a traditional manner and the convolution operation of the first intermediate representation.

As shown in FIG. 4B, the convolution operation implemented in a traditional manner is to acquire the input tensor 1 and the input tensor 2, and then perform complex and computationally intensive convolution operation on the input tensor 1 and the input tensor 2 to obtain an output tensor.

The convolution operation of the first intermediate representation comprises acquiring the input tensor 1 and the input tensor 2. The input tensor 1 may be, for example, a convolution kernel tensor, and the input tensor 2 may be, for example, image data.

For example, the reshaping operation of the convolution kernel tensor may comprise filling the convolution kernel, then slicing the convolution kernel tensor, and finally reshaping. For example, filling the convolution kernel may comprise adding zeros around the convolution kernel. Slicing the convolution kernel tensor may comprise extracting the data in the convolution kernel tensor in segments. For example, M convolution kernels compose a three-dimensional tensor, each convolution kernel is a two-dimensional matrix, and each two-dimensional matrix of KH×KW may be extracted. Finally, the data obtained by slicing is reshaped, for example, each two-dimensional matrix of KH×KW is written as a column vector of N×1 in a row-by-row order, N=KH×KW.

For example, the reshaping operation of the tensor of the image data may comprise slicing, reconstructing, and transposing. For example, a window with a width of KW and a height of KH may be selected to slide from left to right and from top to bottom along the matrix A to obtain a plurality of slicing results. Reshaping may take the data in the first window as the first row of the matrix B, the data in the second window as the second row of the matrix B, and so on until the last window. Thereby, (H−KH+1)×(W−KW+1) row vectors may be obtained. Then, each of (H−KH+1)×(W−KW+1) row vectors is transposed into a column vector.

Then, a plurality of column vectors obtained by reshaping the image data are mapped to voltage values, and the two-dimensional matrix obtained by the reshaping operation on the convolution kernel tensor is mapped to the conductance values of each memristor in the cross array, so as to perform matrix-vector multiplication operations.

In the embodiments of the present disclosure, after the unique matrix-vector multiplication operation of the In-Memory Computing apparatus, each result may be constructed into a tensor sequence (Sequence Construct), and then the sequences may be combined in order to form a new tensor (Concat From Sequence) of M×K, where K=[(W−KW+2P)/S+1]*[(H−KH+2P)/S+1], P represents the position width of zero filling, for example, P=1 represents filling a circle of zeros around the image, and so on; S represents the sliding stride of convolution operation, for example, S=1 represents that the sliding stride of the convolution kernel on the input image each time is 1 unit length. After the new tensor N×K is cascaded by the same set of tensors (Concat), the reshaping (Reshape) and the cascaded by the same batch of tensors (Concat), the output tensor of 1*M*[(W−KW+2P)/S+1]*[(H−KH+2P)/S+1] may be obtained, and this tensor may be used as the input of the next convolution after pooling (Pooling).

Figure 5:
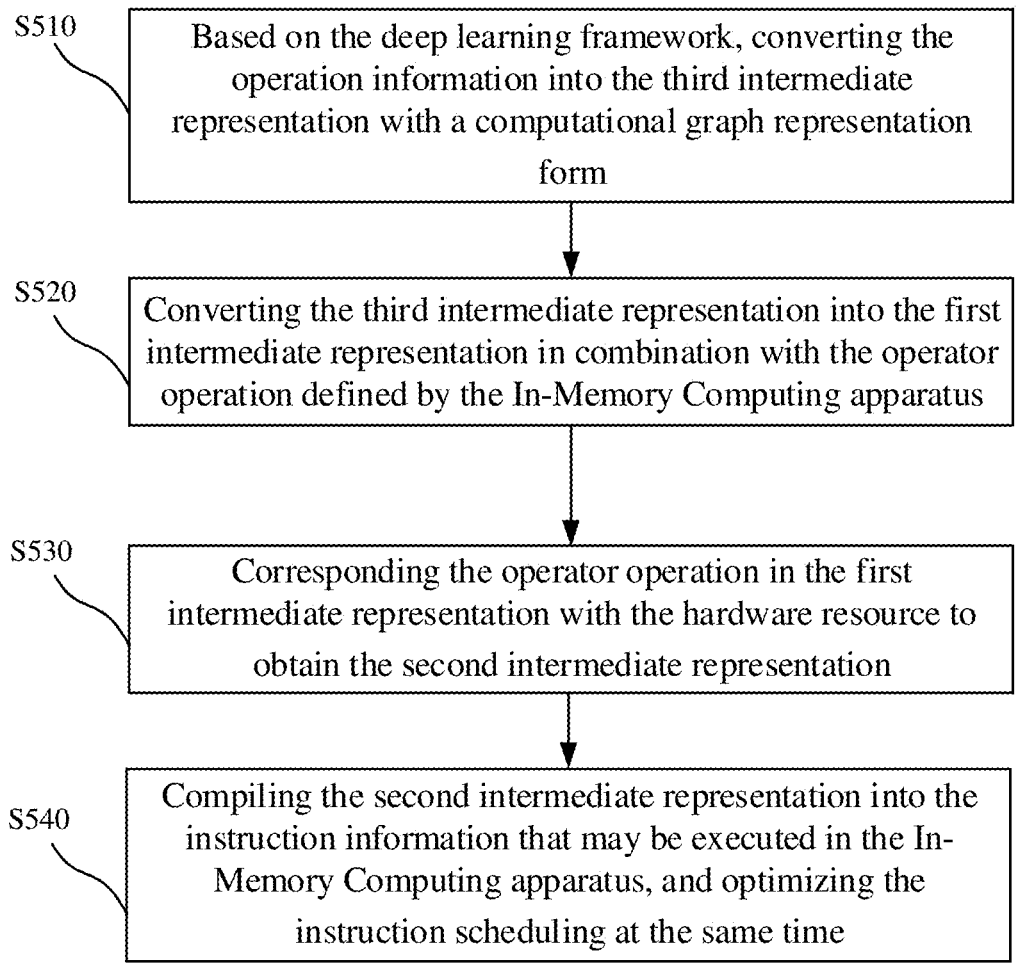
FIG. 5 shows a flow diagram of another compilation method suitable for the In-Memory Computing apparatus provided by at least one embodiment of the present disclosure.

FIG. 5 shows a flow diagram of another compilation method suitable for the In-Memory Computing apparatus provided by at least one embodiment of the present disclosure.

As shown in FIG. 5, the compilation method may comprise steps S510-S540.

Step S510: Based on the deep learning framework, converting the calculation information into the third intermediate representation with a computational graph representation form.

For example, step S21 described above with reference to FIG. 2A may be executed and will not be repeated here.

Step S520: converting the third intermediate representation into the first intermediate representation in combination with the operator operation defined by the In-Memory Computing apparatus.

For example, steps S22 and S23 described above with reference to FIG. 2A may be executed and will not be repeated here.

Step S530: corresponding the operator operation in the first intermediate representation with hardware resources to obtain the second intermediate representation.

For example, step S30 described above with reference to FIG. 1 may be executed and will not be repeated here.

Step S540: compiling the second intermediate representation into the instruction information that may be executed in the In-Memory Computing apparatus, and optimizing the instruction scheduling at the same time.

For example, step S40 described above with reference to FIG. 1 may be executed and will not be repeated here.

It should be noted that in the embodiments of the present disclosure, the flow of the compilation method provided by the above embodiments of the present disclosure may comprise more or fewer operations, which may be executed sequentially or in parallel. Although the flow of the compilation method described above comprises a plurality of operations in a specific order, it should be clearly understood that the order of a plurality of operations is not limited. The compilation method described above may be executed once or multiple times according to predetermined conditions.

Another aspect of the present disclosure provides a compilation apparatus suitable for the In-Memory Computing apparatus. The compilation apparatus suitable for the In-Memory Computing apparatus may compile the algorithm written based on C++ and python into the instruction information that may be executed by the In-Memory Computing apparatus.

Figure 6:
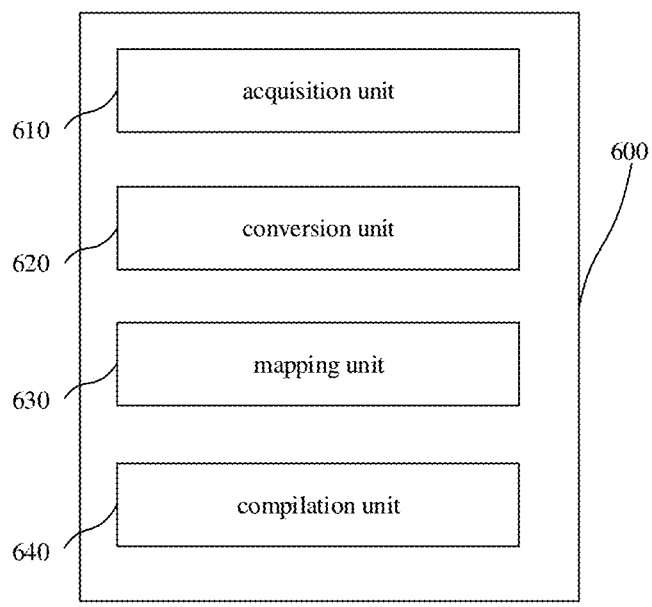
FIG. 6 shows a schematic block diagram of a compilation apparatus suitable for the In-Memory Computing apparatus provided by at least one embodiment of the present disclosure.

FIG. 6 shows a schematic block diagram of a compilation apparatus 600 suitable for the In-Memory Computing apparatus provided by at least one embodiment of the present disclosure.

As shown in FIG. 6, the compilation device 600 suitable for the In-Memory Computing apparatus may comprise an acquisition unit 610, a conversion unit 620, a mapping unit 630 and a compilation unit 640.

The acquisition unit 610 is configured to acquire calculation information of the algorithm to be compiled. For example, the acquisition unit 610 may implement step S10 described in FIG. 1, and the specific implementation of the acquisition unit 610 may refer to the relevant description of step S10, which will not be repeated here.

The conversion unit 620 is configured to convert the algorithm to be compiled into the first intermediate representation according to the calculation information. For example, the first intermediate representation comprises the operator operation executed by the In-Memory Computing apparatus. For example, the conversion unit 620 may implement step S20 described in FIG. 1, and specific implementation of the conversion unit 620 may refer to the relevant description of step S20, which will not be repeated here.

The mapping unit 630 is configured to map the first intermediate representation to the second intermediate representation, for example, the second intermediate representation comprises the corresponding relationship between the hardware information of the In-Memory Computing apparatus and the operator operation. For example, the mapping unit 630 may implement step S30 described in FIG. 1, and the specific implementation of the mapping unit 630 may refer to the relevant description of step S30, which will not be repeated here.

The compilation unit 640 is configured to compile the algorithm to be compiled into the instruction information recognized by the In-Memory Computing apparatus according to the hardware information, so that the In-Memory Computing apparatus may perform the calculation operation according to the instruction information. For example, the compilation unit 640 may implement step S40 described in FIG. 1, and the specific implementation of compilation unit 640 may refer to the relevant description of step S40, which will not be repeated here.

In one embodiment of the present disclosure, the conversion unit 620 comprises: a computational graph generation unit which is configured to parse the algorithm to be compiled, and generate the third intermediate representation according to the parsed result. The third intermediate representation comprises a computational graph representation form of a neural network algorithm; a computational graph conversion unit which is configured to decompose the algorithm to be compiled into the operator operation comprised in the In-Memory Computing apparatus according to the computational graph representation form, and convert the third intermediate representation into the first intermediate representation comprising the operator operation according to the operator operation.

The computational graph generation unit may comprise, for example, a model parsing unit and a computational graph construction unit. The model parsing unit comprises a plurality of parsing sub-units that parse various types of algorithms to be compiled, and each parsing sub-unit is used to parse corresponding types of model files. For example, parsing sub-units may comprise parsers of various deep learning frameworks such as Caffe parser and TensorFlow parser to parse according to the neural network model developed by various neural learning frameworks. The computational graph construction unit may, but is not limited to, generate the first intermediate representation in ONNX format from the parsed result, and give it in the form of computational graph.

In one embodiment of the present disclosure, the computational graph conversion unit comprises: an operator extension definition unit which is configured to define the operator operation executed by the In-Memory Computing apparatus to determine the definition information of the operator operation; an operator conversion unit which is configured to determine the operator operation corresponding to the complex operation comprised in the computational graph according to the definition information; and a computational graph optimization unit which is configured to convert the third intermediate representation into the first intermediate representation comprising the operator operation according to the operator operation.

Another aspect of the present disclosure provides a computer device, and the computer device comprises the compilation apparatus of any embodiment provided by the embodiments of the present disclosure and the In-Memory Computing apparatus. The In-Memory Computing apparatus is configured to perform the calculation operation according to the instruction information compiled by the compilation apparatus.

Figure 7A:
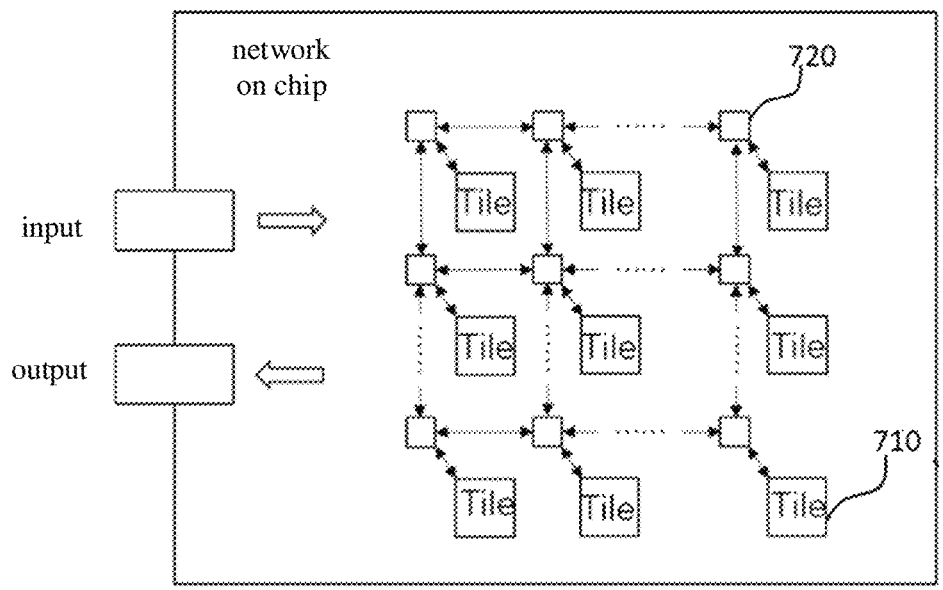
FIG. 7A shows a structural diagram of the In-Memory Computing apparatus provided by at least one embodiment of the present disclosure.

FIG. 7A shows a structural diagram of the In-Memory Computing apparatus provided by at least one embodiment of the present disclosure.

As shown in FIG. 7A, the In-Memory Computing apparatus may comprise a plurality of first processing units 710 and a plurality of second processing units 720.

For example, a plurality of first processing units 710 may be used for processing input signals, respectively. For example, a plurality of second processing units 720 may process the intermediate data obtained by processing the input signal by the first processing unit 710 again, respectively. For example, intermediate data are exchanged between two second processing units 720.

For example, a plurality of first processing units 710 may form an array, and each first processing unit 710 may comprise a component in the In-Memory Computing mode. For example, the structure of each first processing unit 710 may be the same or different, which is not limited by the present disclosure.

Figure 7B:
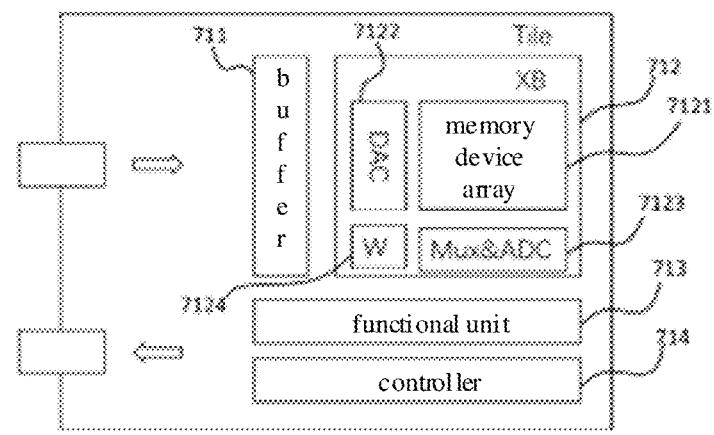
FIG. 7B shows a schematic structural diagram of the first processing unit provided by at least one embodiment of the present disclosure.

FIG. 7B shows a structural diagram of the first processing unit 110 provided by at least one embodiment of the present disclosure.

As shown in FIG. 7B, the first processing unit 710 may comprise a buffer 711, an XB module 712, a special functional unit 713, and a controller 714.

The XB module 712 may comprise, for example, an In-Memory Computing array 7121 composed of memory devices in the In-Memory Computing mode.

In one embodiment of the present disclosure, the In-Memory Computing array 7121 may comprise, for example, a cross array. The cross array may comprise, for example, non-volatile memory devices for the In-Memory Computing apparatus. For example, the In-Memory Computing array 1721 may be a cross array composed of non-volatile memory devices for the In-Memory Computing apparatus. The non-volatile memory device for In-Memory Computing system may be, for example, a memristor, a resistive variable memory, etc.

In one embodiment of the present disclosure, the XB module 712 may also comprise, for example, a driving unit 7124 and a converter. The converter may comprise, for example, a DAC 7122 module and a multiplexing and ADC module 7123.

For example, The buffer 711 may be used to cache data, and may send cached data to the XB module 712, so that the XB module 712 may be used to process the cached data from the buffer 711. For example, Multiply-and-Accumulate calculations may be executed on the cached data. In one embodiment of the present disclosure, the buffer 711 may store intermediate data comprised in the second intermediate representation, for example.

The converter is configured to convert intermediate data into input data of a cross array. The DAC module 7122 may, for example, convert a digital signal from the buffer 711 into an analog signal and input the analog signal to the memory array 7121. The multiplexer in the multiplexing and ADC module 7123 may be used as a selection switch, and the multiplexing and the ADC in the ADC module 7123 is configured to convert the output result of the cross array into a digital signal.

In one embodiment of the present disclosure, for example, the conductivity value of the memory in the memory array may be changed by the driving unit 7124.

In one embodiment of the present disclosure, the In-Memory Computing apparatus may also comprise a functional unit 713.

For example, in the case of the cached data is large, the functional unit 713 may allocate the cached data to a plurality of In-Memory Computing arrays, and then sum the operation results of the plurality of In-Memory Computing arrays. In addition, the functional unit 713 may be used to implement the function of an activation function such as Sigmoid or ReLU, for example.

Those skilled in the art may set the required functional unit 713 in the In-Memory Computing apparatus to implement special functions. The present disclosure does not limit the functions of the functional unit 713.

For example, the controller 714 may control the buffer 711, the switching circuit in the XB module 712 and the functional unit 713, and the controller may also perform some operator operations implemented by software, such as the reshaping operation, etc.

The In-Memory Computing apparatus shown in FIG. 7A and FIG. 7B may perform the matrix-vector multiplication operation, the activation function operation, etc.

For example, for the convolution operation, the buffer may reuse the input feature map and store a part of intermediate data at the same time. The XB module 712 may use writing and driving circuit to change the resistances of the memory devices in the array, thereby implementing the update of the convolution kernel. The data input from the buffer is converted into a voltage value through a digital-to-analog converter and the voltage value is applied to one side of the array, then converted into a calculated current value after passing through the array, and then converted into the output digital information after being quantized by the analog-to-digital converter. The functional unit has two main functions. The first is that when the convolution layer or fully connected layer is larger than the array, the weights will be decomposed into a plurality of arrays, and then the operation results of the plurality of arrays will be summed. The second is that the functional unit may be used as an activation function to implement the functions of the activation function such as Sigmoid or ReLU.

Figure 7C:
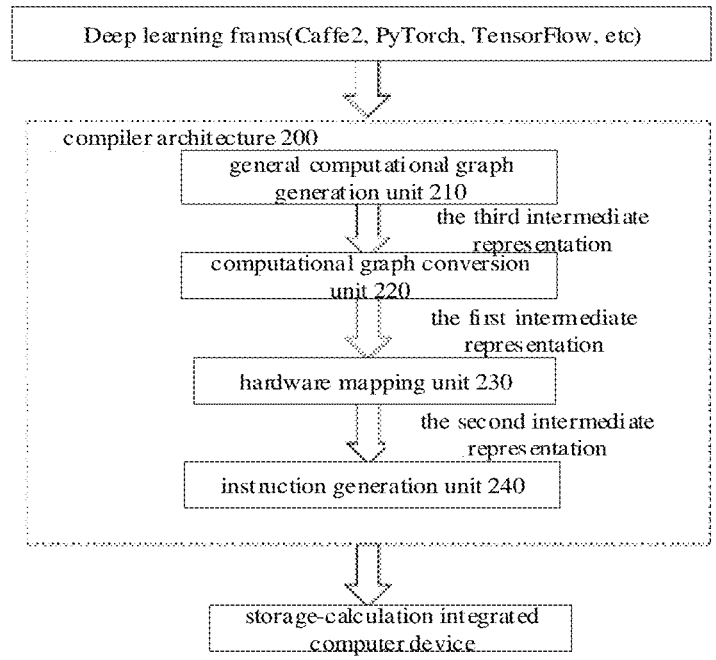
FIG. 7C shows a structural diagram of the compiler architecture suitable for the In-Memory Computing apparatus provided by some embodiments of the present disclosure.

FIG. 7C shows a structural diagram of a compiler architecture suitable for the In-Memory Computing apparatus provided by some embodiments of the present disclosure.

As shown in FIG. 7C, the compiler architecture may comprise a general computational graph generation unit 210, a computational graph conversion unit 220, a hardware mapping unit 230 and an instruction generation unit 240.

The general computational graph generation unit 210 may, for example, convert the neural network algorithm developed under various deep learning frameworks into the third intermediate representation. For example, the general computational graph generation unit may implement step S21 described in FIG. 2A, and the specific implementation of the general computational graph generation unit 210 may refer to the relevant description of step S30, which will not be repeated here.

For example, the computational graph conversion unit 220 may convert the third intermediate representation into the first intermediate representation. For example, the computational graph conversion unit may implement the step S22 and the step S23 described in FIG. 2A, and the specific implementation of the computational graph conversion unit 220 may refer to the relevant description of step S30, which will not be repeated here.

For example, the hardware mapping unit 230 may convert the first intermediate representation to the second intermediate representation. For example, the hardware mapping unit may perform step S30 described above with reference to FIG. 1, which will not be repeated here.

The instruction generation unit 240 may, for example, generate instruction information which may be executed by the In-Memory Computing apparatus according to the second intermediate representation for the In-Memory Computing apparatus to execute the instruction information. For example, the instruction generation unit may perform step S40 described above with reference to FIG. 1, which will not be repeated here.

At least one embodiment of the present disclosure also provides another compilation apparatus suitable for the In-Memory Computing apparatus, the compilation apparatus comprises a processor and a memory, and the memory comprises one or more computer program modules. One or more computer program modules are stored in the memory and configured to be executed by the processor, and one or more computer program modules comprise instructions for implementing the above compilation method. The compilation apparatus may compile the calculation information into the instructions that may be directly executed by the In-Memory Computing apparatus, thereby implementing the effect of accelerating the operations of various algorithms by using the In-Memory Computing apparatus.

Figure 8:
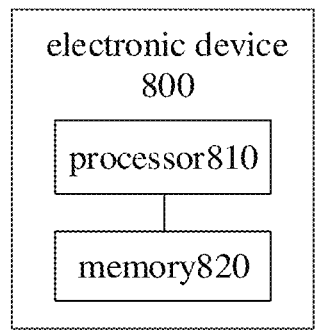
FIG. 8 shows a block diagram of a compilation apparatus suitable for the In-Memory Computing apparatus provided by some embodiments of the present disclosure.

FIG. 8 is a block diagram of a compilation apparatus suitable for the In-Memory Computing apparatus provided by some embodiments of the present disclosure. As shown in FIG. 8, the compilation apparatus 800 comprises a processor 810 and a memory 820. The memory 820 is used to store non-volatile computer-readable instructions (e.g., one or more computer program modules). The processor 810 is used to run non-volatile computer-readable instructions, and when the non-volatile computer-readable instructions are run by the processor 810, one or more steps of the compilation method described above may be executed. The memory 820 and the processor 810 may be interconnected by a bus system and/or other forms of connection mechanism (not shown).

For example, the processor 810 may be a central processing unit (CPU), a graphics processing unit (GPU), or other form of processing unit with data processing capability and/or program execution capability. For example, the central processing unit (CPU) may be X86 or ARM architecture, etc. The processor 810 may be a general-purpose processor or a special-purpose processor, and may control other components in the compilation device 800 to perform the desired functions.

For example, the memory 820 may comprise any combination of one or more computer program products, which may comprise various forms of computer-readable storage media, such as volatile memory and/or non-volatile memory. The volatile memory may comprise, for example, random access memory (RAM) and/or cache, etc. The non-volatile memory may comprise, for example, read only memory (ROM), hard disk, erasable programmable read only memory (EPROM), portable compact disk read only memory (CD-ROM), USB memory, flash memory, etc. One or more computer program modules may be stored on computer-readable storage media, and the processor 810 may run one or more computer program modules to implement various functions of the compilation apparatus 800. Various applications and various data, as well as various data used and/or generated by applications, may also be stored in the computer-readable storage media.

It should be noted that in the embodiments of the present disclosure, the specific functions and technical effects of the compilation apparatus 700 may refer to the description of the compilation method above, which will not be repeated here.

Figure 9:
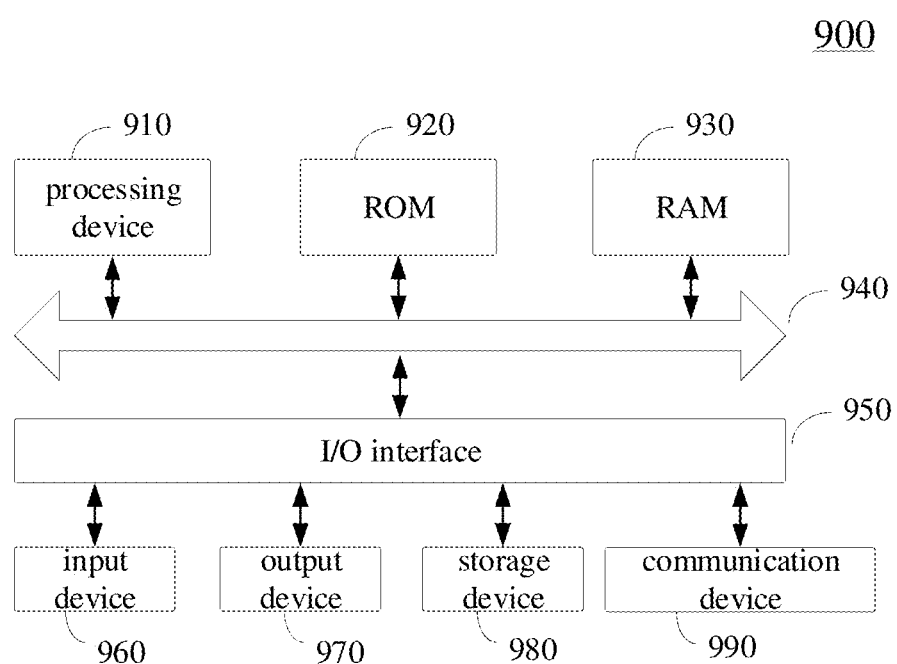
FIG. 9 shows a schematic block diagram of an electronic device provided by some embodiments of the present disclosure.

FIG. 9 is a schematic block diagram of an electronic device provided by some embodiments of the present disclosure. The electronic device 900 is suitable, for example, for implementing the compilation method provided by the embodiments of the present disclosure. The electronic device 900 may be a terminal device or the like. It should be noted that the electronic device 900 shown in FIG. 9 is only an example, which will not bring any restrictions on the function and scope of use of the embodiments of the present disclosure.

As shown in FIG. 9, the electronic device 900 may comprise a processing apparatus (for example, a central processing unit, a graphics processor, etc.) 910 which may perform various appropriate actions and processes according to a program stored in the read only memory (ROM) 920 or a program loaded from the storage device 990 into the random access memory (RAM) 930. Various programs and data required for the operation of the electronic device 900 are also stored in RAM 930. The processing apparatus 910, ROM 920, and RAM 930 are connected to each other through a bus 940. The input/output (I/O) interface 950 is also connected to the bus 940.

Generally, the following devices may be connected to the I/O interface 950: an input device 960 comprising, for example, a touch screen, a touch pad, a keyboard, a mouse, a camera, a microphone, an accelerometer, a gyroscope, etc.; an output device 970 comprising, for example, a liquid crystal display (LCD), a speaker, a vibrator, etc.; a storage device 990 comprising, for example, a magnetic tape, a hard disk, etc.; and a communication device 990. The communication device 990 may allow the electronic equipment 900 to perform wireless or wired communication with other electronic equipment to exchange data. Although FIG. 9 shows an electronic equipment 900 having various devices, it should be understood that it is not required to implement or have all the devices shown, and the electronic equipment 900 may alternatively implement or have more or fewer devices.

For example, according to the embodiments of the present disclosure, the above compilation method may be implemented as a computer software program. For example, the embodiments of the present disclosure comprise a computer program product which comprises a computer program carried on non-volatile computer-readable media, and the computer program comprises program codes for performing the above information processing method. In such an embodiment, the computer program may be downloaded and installed from the network through the communication device 990, or installed from the storage device 990, or installed from the ROM 920. When the computer program is executed by the processing device 910, the functions defined in the information processing method provided by the embodiments of the present disclosure may be implemented.

At least one embodiment of the present disclosure also provides a computer-readable storage medium for storing non-volatile computer-readable instructions, and the above compilation method may be implemented when the non-volatile computer-readable instructions are executed by a computer. Using the computer-readable storage medium, the calculation information may be compiled into instructions that may be directly executed by the In-Memory Computing apparatus, thereby realizing the effect of accelerating the operation of various algorithms by using the In-Memory Computing apparatus.

Figure 10:
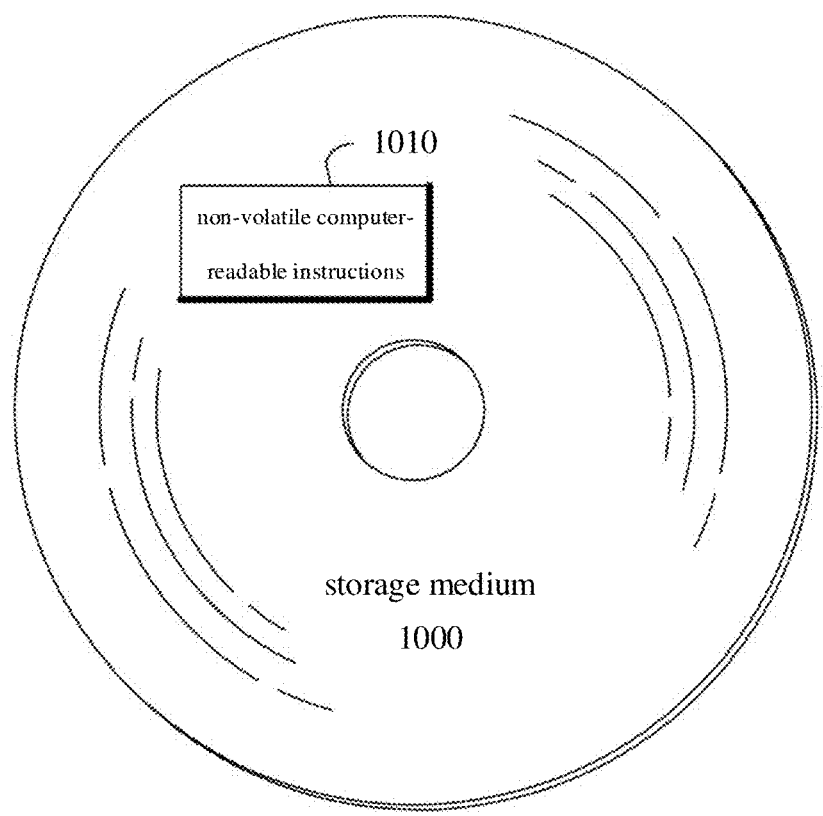
FIG. 10 shows a schematic diagram of a computer-readable storage medium provided by some embodiments of the present disclosure.

FIG. 10 is a schematic diagram of a computer-readable storage medium provided by some embodiments of the present disclosure. As shown in FIG. 10, the computer-readable storage medium 1000 is used to store non-volatile computer-readable instructions 1010. For example, when the non-volatile computer-readable instructions 1010 are executed by a computer, one or more steps in the compilation method described above may be executed.

For example, the computer-readable storage medium 1000 may be applied to the above compilation apparatus 800. For example, the computer-readable storage medium 1000 may be a memory 820 in the compilation apparatus 800 shown in FIG. 8. For example, the relevant description of the computer-readable storage medium 1000 may refer to the corresponding description of the memory 820 in the compilation apparatus 800 shown in FIG. 8, which will not be repeated here.

There are following points to be explained:

(1) In the attached drawings of the embodiments of the present disclosure, only the structures related to the embodiments of the present disclosure are concerned, and other structures may refer to a general design.

(2) In the case of no conflicts, the features in the same embodiments and different embodiments of the present disclosure may be combined with each other.

The above are only specific embodiments of the present disclosure, but the protection scope of the present disclosure is not limited to this. The protection scope of the present disclosure should be subject to the protection scope of the claims.

What is claimed is:

1. A compilation method applicable to an In-Memory Computing apparatus, comprising:
   acquiring calculation information of an algorithm to be compiled;
   converting the algorithm to be compiled into a first intermediate representation according to the calculation information, wherein the first intermediate representation comprises an operator operation executed by the In-Memory Computing apparatus;
   mapping the first intermediate representation to a second intermediate representation, wherein the second intermediate representation comprises a corresponding relationship between hardware information of the In-Memory Computing apparatus and the operator operation; and
   compiling the algorithm to be compiled into instruction information recognized by the In-Memory Computing apparatus according to the corresponding relationship, to make the In-Memory Computing apparatus execute the instruction information,
   wherein converting the operation to be compiled into the first intermediate representation according to the calculation information, comprises:
   performing a parsing operation on the algorithm to be compiled, and generating a third intermediate representation according to a parsing result of the parsing operation, wherein the third intermediate representation comprises a computational graph representation form of the algorithm to be compiled;
   decomposing the algorithm to be compiled into the operator operation comprised in the In-Memory Computing apparatus according to the computational graph representation form; and
   converting the third intermediate representation into the first intermediate representation comprising the operator operation according to the operator operation.

2. The method according to claim 1, wherein the In-Memory Computing apparatus comprises a cross array composed of non-volatile memory devices for the In-Memory Computing apparatus, and the operator operation comprises a matrix-vector multiplication operation.

3. The method according to claim 1, wherein the algorithm to be compiled comprises a neural network algorithm.

4. The method according to claim 3, wherein the neural network algorithm is developed based on any one of a plurality of different deep learning frameworks and is transformed into the computational graph representation form.

5. The method according to claim 3, wherein performing the parsing operation on the algorithm to be compiled and generating the third intermediate representation according to the parsing result of the parsing operation, comprises:

based on a deep learning framework that is applicable to the neural network algorithm, parsing the neural network algorithm correspondingly to generate the third intermediate representation.

6. The method according to claim 3, wherein the computational graph representation form comprises an open neural network exchange format.

7. The method according to claim 1, further comprising:

acquiring definition information of the operator operation executed by the In-Memory Computing apparatus, wherein the definition information is used to describe the operator operation, wherein decomposing the algorithm to be compiled into the operator operation comprised in the In-Memory Computing apparatus according to the computational graph representation form, comprises:

determining the operator operation corresponding to a calculation operation comprised in the computational graph representation form according to the definition information.

8. The method according to claim 7, wherein the calculation operation comprises a convolution operation, and the operator operation comprises a matrix-vector multiplication operation, wherein determining the operator operation corresponding to the calculation operation comprised in the computational graph representation form according to the definition information, comprises:

determining at least one convolution kernel of the convolution operation and data to be convolved according to the calculation information;

according to definition information of the matrix-vector multiplication operation, determining that the operator operation associated with the convolution operation comprises a reshaping operation, wherein the reshaping operation is configured to reshape the at least one convolution kernel into a matrix, and reshape the data to be convolved into a plurality of vectors, wherein each column in the matrix represents a convolution kernel.

9. The method according to claim 8, wherein the In-Memory Computing apparatus comprises a memory array, wherein mapping the first intermediate representation to the second intermediate representation, comprises:

mapping elements of the matrix in the first intermediate representation to conductance values of memories in the memory array; and mapping the plurality of vectors into which the data to be convolved is reshaped into a voltage vector, respectively, wherein the voltage vector is used as an input of each row in the memory array, to make the memory array perform a multiplication operation of matrix and vector according to the voltage vector and a conductance value matrix formed by the conductance values.

10. The method according to claim 1, wherein the operator operation further comprises an activation function.

11. A compilation apparatus applicable to an In-Memory Computing apparatus, comprising:

at least one processor;

a memory, comprising one or more computer program modules;

wherein the one or more computer program modules are stored in the memory and configured to be executed by the at least one processor, and the one or more computer program modules comprise instructions used to implement the compilation method according to claim 1.

12. A storage medium which non-temporarily stores computer-readable instructions, wherein when the computer-readable instructions are executed by a computer, the computer executes the compilation method according to claim 1.

13. A compilation apparatus applicable to an In-Memory Computing apparatus, comprising:

an acquisition processor, configured to acquire calculation information of an algorithm to be compiled;

a conversion processor, configured to convert the algorithm to be compiled into a first intermediate representation according to the calculation information, wherein the first intermediate representation comprises an operator operation executed by the In-Memory Computing apparatus;

a mapping processor, configured to map the first intermediate representation to a second intermediate representation, wherein the second intermediate representation comprises a corresponding relationship between hardware information of the In-Memory Computing apparatus and the operator operation; and a compilation processor, configured to compile the algorithm to be compiled into instruction information recognized by the In-Memory Computing apparatus according to the corresponding relationship, to make the In-Memory Computing apparatus execute a calculation operation according to the instruction information, wherein the first conversion processor comprises:

a computational graph generation processor generator, configured to parse the algorithm to be compiled and generate a third intermediate representation according to a parsing result, wherein the third intermediate representation comprises a computational graph representation form of the algorithm to be compiled;

a computational graph conversion processor converter, configured to decompose the algorithm to be compiled into the operator operation comprised in the In-Memory Computing apparatus according to the computational graph representation form, and convert the third intermediate representation into the first intermediate representation comprising the operator operation according to the operator operation.

14. The compilation apparatus according to claim 13, wherein the computational graph conversion processor comprises:

an operator extension definition processor, configured to define the operator operation executed by the In-Memory Computing apparatus, to determine definition information of the operator operation;

an operator transformation processor, configured to determine an operator operation corresponding to a complex operation comprised in the computational graph representation form according to the definition information;

a computational graph optimization processor, configured to convert the third intermediate representation into the first intermediate representation comprising the operator operation according to the operator operation.

15. A computing device, comprising:
the compilation apparatus according to claim 13; and
the In-Memory Computing apparatus;
wherein the In-Memory Computing apparatus is configured to perform the calculation operation according to the instruction information compiled by a compilation device.

16. The computing device according to claim 15, wherein the In-Memory Computing apparatus comprises a cross array, wherein the cross array comprises non-volatile memory devices for the In-Memory Computing apparatus, the operator operation comprises a matrix-vector multiplication operation.

17. The computing device according to claim 16, wherein the In-Memory Computing apparatus further comprises:
a buffer, configured to store intermediate data comprised in the second intermediate representation; and
a converter, configured to convert the intermediate data into input data of the cross array.

18. The computing device according to claim 17, wherein the In-Memory Computing apparatus further comprises:
a functional processor, configured to distribute the input data to a plurality of cross arrays.

* * * * *